Figure 1:
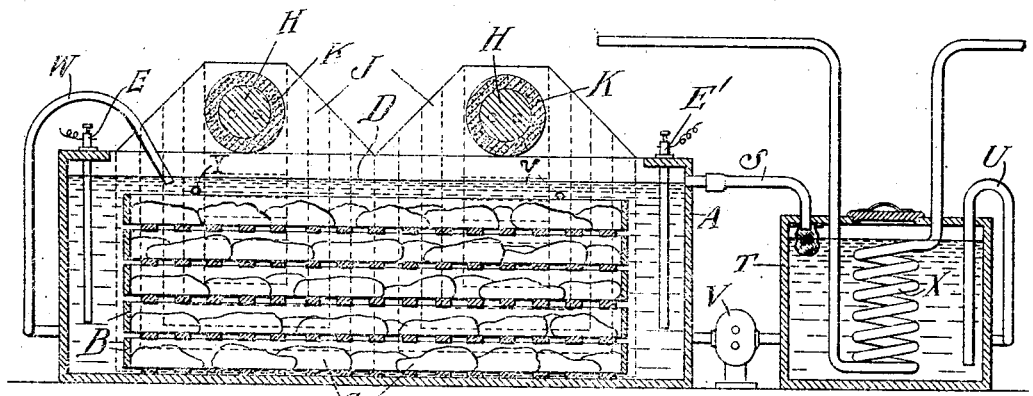

J. C. LINCOLN.
PROCESS OF PRESERVING.
APPLICATION FILED SEPT. 27, 1909.

1,044,201.

Patented Nov. 12, 1912.

WITNESSES:
Nathan F. Fretter
M. E. Naif

INVENTOR,
John C. Lincoln
By Bates, Fouts & Hull
ATTYS.

UNITED STATES PATENT OFFICE.

JOHN C. LINCOLN, OF CLEVELAND, OHIO, ASSIGNOR TO THE ELECTRIC MEAT CURING COMPANY, OF CLEVELAND, OHIO, A CORPORATION OF MAINE.

PROCESS OF PRESERVING.

1,044,201. Specification of Letters Patent. Patented Nov. 12, 1912.

Application filed September 27, 1909. Serial No. 519,675.

*To all whom it may concern:*

Be it known that I, JOHN C. LINCOLN, a citizen of the United States, residing at Cleveland, in the county of Cuyahoga and State of Ohio, have invented a certain new and useful Improvement in Processes of Preserving, of which the following is a full, clear, and exact description, reference being had to the accompanying drawings.

This invention relates to a process for the curing or preserving of various substances, as meat, fruit, food stuffs generally, hides, etc. The process is characterized by extreme rapidity in the curing, as well as thoroughness and evenness of the penetration of the curing substance.

It has been known for some time that the passage of an electric current through a substance being cured and the surrounding curing medium reduces the time of curing from that required by ordinary soaking. I have discovered that if the electric curing be carried on in a magnetic field, the time is further reduced to a most remarkable degree.

In carrying out my invention, I place the articles to be cured or preserved in a suitable receptacle, surround them by curing medium and pass an electric current through the articles and medium, while maintaining a magnetic field with the lines of force thereof transverse to the direction of the current, and I alternate the polarity of either the magnetic or the electric current. The effect of the magnetic action is apparently to cause the filaments of medium which constitute conductors for the current to be deflected, so that they press against the articles being cured, forcing the curing medium into the same. I deem it preferable to use an alternating current through the curing medium, not only to prevent formation of undesirable gas, resulting from electrolysis, but because the curing is more even when the magnetic pressure of the paths of current is first in one direction and then in the other. After the curing medium is within the pores of the substance being cured, the substance retains it against outward movement when the magnetic action deflects the conductor of curing medium from the meat, caused by an alternation in the direction of the current or the magnetism. The filamental conductors of curing medium thus continuously bombard the substance being cured by a series of blows, as it were, with intermediate recessions, and each blow carries more of the curing medium into the substance, thus furnishing a more penetrative path for the current on the following blow.

In carrying out my invention, as applied, for example, to the curing of meat, I place the various pieces in order in separated horizontal layers in a tank which has at its opposite ends electrodes forming the terminals of an electric circuit, there being on opposite sides of the tank pole pieces of a powerful electromagnet whose lines of force pass horizontally through the tank at right angles to the normal direction of the current. I place within the tank brine surrounding the meat and, in the preferred form, I supply an alternating current to the terminals in the brine and a direct current to the magnet. The lines of force of the magnetism being at right angles to the current tend to either lift or depress the filamental paths for that current, there being a succession of such up and down movements corresponding to the alternations of the current.

The effect of the actions described I believe to be a continuous bombardment of the meat by filaments of brine which occupy the pores of the meat and pass farther and farther thereinto. Whether this is a complete explanation, or the true explanation, of the phenomenon, I know by experiment that the magnetism does cause the brine to penetrate the meat more thoroughly and very much more quickly than when the operation is conducted without the magnetism. For example, with such an apparatus as described I have cured bacon of ordinary size in less than four hours, whereas without the magnetism it requires by the electric action three or four days, and without the magnetism or electric action twenty days.

The drawings illustrate the process by showing an apparatus which may be used in carrying out the process, though it is to be understood that the process is not limited to the employment of any particular apparatus. The apparatus shown is made the subject of a divisional application #586271, filed by me on Oct. 10, 1910.

Figure 2:
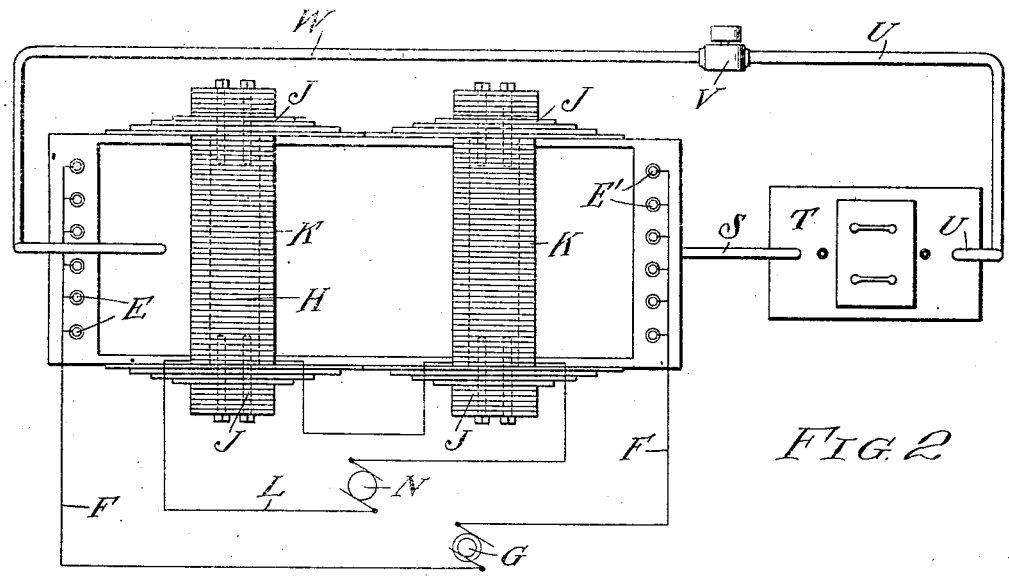
Figure 3:
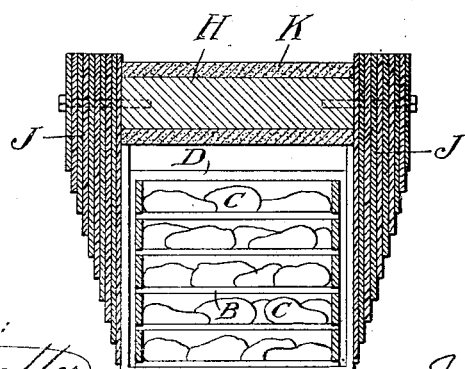

In these drawings Figure 1 is a longitudinal vertical section of the apparatus; Fig. 2 is a plan, and Fig. 3 a transverse section.

Referring to the illustration in the drawings, A represents a suitable tank, B racks which may be placed therein and are adapted to contain the articles to be cured, as for example, pieces of meat C. This meat is maintained by the racks separated in regular parallel horizontal layers so that the brine, indicated by D, has a perfect access to each piece.

E and E' represent the electrodes which may be carbon pencils, those of one end being all connected in multiple and those at the other in multiple, and the two sets constituting the terminals of a circuit conductor indicated by F, which has a source of current, preferably alternating current, indicated by the generator G.

Extending across the top of the tank, in the illustration given, are two electromagnets. Each of these magnets has a core H and a pair of pole pieces J and J' extending down on the opposite sides of the tank and a winding conductor K which is adapted to be in a closed circuit by reason of the conductors L with the generator N, preferably of direct current. The pole pieces extend for a considerable distance on the sides of the tank and are reduced in thickness as they recede from the core so as to preserve the magnetic density approximately uniform throughout the space between the poles. By having a plurality of these magnets arranged side by side, with their pole pieces substantially covering the sides of the tank, I am enabled to obtain a magnetic density approximately uniform throughout the tank.

The trays are removable for convenient installation. They are held down by suitable means, as the pegs Y. The magnets are also preferably removable, which enables one set of magnets to operate with several tanks, whereby one tank may be in the process of being packed while another is being treated.

In order to bring fresh brine constantly to the meat so that the salt will be immediately at hand for rapid penetration of each piece, I circulate the brine through the tank. The circulation system is illustrated in the drawing by the pipe S leading from the tank to an outside tank T, the pipe U leading from this outside tank to a pump V and the pipe W leading from the pump back to the tank. The pipe S is of rubber or other insulation, to prevent short circuiting of current.

It is an easy matter to cool the circulating brine by having a coil X of pipe in the outside tank, this coil carrying cooling medium from a suitable cooling system. I illustrate this cooling system because I know the operation works perfectly with it. I believe, however, that owing to the extreme rapidity with which the curing takes place that the cooling may be dispensed with, thereby saving an enormous expense in the equipment of a curing plant.

I do not intend to limit myself to a particular strength of current, or magnetic density or saturation of brine, or duration of curing, or size or form of apparatus, as all these factors will vary with conditions. By way of illustration, however, I will state that the following sizes seem to me good for a commercial installation, being based on my experience with a smaller apparatus of similar proportions which has given most excellent results, namely: a tank fourteen feet long, four feet wide and four feet deep; the electric current through the tank alternating sixty cycles, five to ten amperes per square foot of the cross section of the tank contents; the magnets being two in number, each having a twelve inch core with sixty thousand ampere turns of conductor about each core. With such an apparatus, and about two kilowatts supplied to each magnet (which gives a magnetic density of from five thousand to eight thousand lines per square inch in the tank); with brine of seventy to eighty per cent. saturation, and temperature maintained at about thirty eight degrees Fahrenheit, my experience shows that bacon of ordinary size (two or three inches in thickness) can be cured in from three to four hours, the curing being thorough and even and the product being perfect in every respect.

Having thus described my invention, what I claim is:

1. The process of preserving consisting of holding the article being preserved in contact with a preserving medium in the path of an electric current in a magnetic field, the magnetic flux and the electric current acting simultaneously and one of them being varied.

2. The process of preserving consisting of subjecting the article being preserved to a continuous bombardment of the preserving medium in a condition adapted to penetrate the pores of the substance being preserved, said bombardment being caused by an electric current acting within a magnetic flux, one of such agencies being varied.

3. The process of preserving consisting of subjecting the article being preserved and the curing medium to an alternating electric current in a magnetic field.

4. The process of preserving consisting of surrounding the article to be preserved by a preserving medium, passing an electric current through the article and medium while maintaining the article and medium in a magnetic field with its lines of force transverse to the path of the electric current, the magnetic flux and the flow of the current being one alternated and the other direct.

5. The process of preserving consisting of surrounding the article to be preserved by a preserving medium, passing an alternating electric current through the article and medium from electrodes in the medium, while maintaining the article and medium in the field of an electromagnet.

6. The process of preserving consisting of surrounding the article to be preserved by a preserving medium, passing an alternating current through the article and medium while maintaining them in a magnetic field with the lines passing continuously in one direction.

7. The process of curing consisting of immersing the material to be cured in brine, passing an electric current through the brine and material, circulating the brine, and maintaining a magnetic field extending across the brine and material, the magnetic flux and the flow of the current being one alternated and the other direct.

8. The process of curing meat consisting of immersing the same in a tank containing brine, maintaining such tank in a magnetic field extending transversely thereof, passing an alternating current through the tank longitudinally thereof, and circulating the brine about the materials being cured.

9. The process of curing meat consisting of placing the individual pieces thereof in a tank in separated horizontal layers, circulating brine through the tank in which the meat is submerged, passing an alternating current through the tank lengthwise thereof, and maintaining the tank in a magnetic field whose lines of force pass through the tank at substantially right angles to the direction of the current and with approximately equal density throughout the tank.

10. In a process of preserving, the subjection of the article to be preserved to the action of a body of conductive fluid under the influence of an electric current and within a magnetic field, the electric current and the magnetic flux coacting and one of them being varied, whereby the preserving medium is forced into more intimate coaction with the articles to be preserved.

11. In a process of preserving, the subjection of the article to be preserved to the action of a liquid preserving agent under the influence of an electric current and within a magnetic field, the electric current and the magnetic flux coacting and one of them being varied, whereby the preserving medium is forced into more intimate coaction with the articles to be preserved.

12. A curing process consisting of the subjection of the treated material to a suitable fluid body possessing curative qualities in the presence of an artificial magnetic field, and under the influence of an alternating current.

13. A curing process consisting of the subjection of the treated material to a conductive fluid body possessing curative qualities in the presence of an artificial magnetic field and under the influence of the electric current, the electric current and the magnetic flux coacting and one of them being varied, whereby the preserving medium is forced into more intimate coaction with the articles to be preserved.

14. The process of preserving consisting of immersing the article to be preserved in a fluid curative agent and subjecting such agent to physical action resulting from the passage of an electric current under the influence of a varied artificial magnetic field.

15. The process of hastening the preservative action by fluid curative agent consisting in subjecting the material being preserved and the agent to the combined action of an electric current and magnetism and varying one of such agencies while circulating the fluid agent to supply fresh preserving material.

In testimony whereof, I hereunto affix my signature in the presence of two witnesses.

JOHN C. LINCOLN.

Witnesses:
ALBERT LYNN LAWRENCE,
ALBERT H. BATES.